United States Patent
Yamamoto et al.

(10) Patent No.: US 8,581,555 B2
(45) Date of Patent: Nov. 12, 2013

(54) SECONDARY BATTERY SYSTEM INCLUDING AN ARRANGEMENT TO DETERMINE A TEMPORARY INCREASE IN DIRECT CURRENT RESISTANCE OF THE SECONDARY BATTERY

(75) Inventors: Tsunenori Yamamoto, Hitachi (JP);
Takefumi Okumura, Hitachinaka (JP);
Hironori Sasaki, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 13/015,934

(22) Filed: Jan. 28, 2011

(65) Prior Publication Data

US 2011/0187312 A1    Aug. 4, 2011

(30) Foreign Application Priority Data

Jan. 29, 2010   (JP) ................................. 2010-017815

(51) Int. Cl.
*H02J 7/00*       (2006.01)
*H02J 7/06*       (2006.01)

(52) U.S. Cl.
USPC ........................... 320/134; 320/128; 320/164

(58) Field of Classification Search
USPC ................. 320/127, 128, 134, 136, 151, 152, 320/156–159, 161–164; 324/426, 429, 430, 324/434

See application file for complete search history.

(56) References Cited

U.S. PATENT DOCUMENTS 4,888,716 A  * 12/1989  Ueno ............................ 702/63
6,087,808 A    7/2000  Pritchard
8,108,161 B2 *  1/2012  Tomura et al. ................. 702/63

FOREIGN PATENT DOCUMENTS

| JP | 08-043505 | 2/1996 |
| JP | 2003-129927 | 5/2003 |
| JP | 2007-055450 | 3/2007 |
| WO | WO2009/093723-A-1 | 7/2009 |

* cited by examiner

*Primary Examiner* — Richard V Muralidar (74) *Attorney, Agent, or Firm* — Antonelli, Terry, Stout & Kraus, LLP.

(57) ABSTRACT

Provided is a secondary battery system including: a battery controller which controls charge and discharge of a secondary battery; a total controller which controls the entire system; an ammeter which detects a charge current and a discharge current of the secondary battery; and a voltmeter which detects a voltage of the secondary battery, in which a direct current resistance of the secondary battery at the time of charge and a direct current resistance of the secondary battery at the time of discharge are obtained on the basis of a current value and a voltage value detected by the ammeter and the voltmeter, to thereby determine a temporary increase in the direct current resistance of the secondary battery caused by charge and discharge with a large current on the basis of a relation between the two obtained direct current resistances. Accordingly, in a secondary battery system used in a hybrid system, a wind power generating system, a photovoltaic power generating system, and the like, the situation where a direct current resistance thereof transitionally (temporarily) increases is simply detected on the basis of the usage situation of a secondary battery, to thereby accurately calculate the deterioration state of the secondary battery and thus enable an appropriate coping process, so that the life of the secondary battery can be extended.

10 Claims, 8 Drawing Sheets

SECONDARY BATTERY SYSTEM INCLUDING AN ARRANGEMENT TO DETERMINE A TEMPORARY INCREASE IN DIRECT CURRENT RESISTANCE OF THE SECONDARY BATTERY

The present application is based on and claims priority of Japanese patent application No. 2010-017815 filed on Jan. 29, 2010, the entire contents of which are hereby incorporated by reference.

BACKGROUND OF THE INVENTION

1. Field of the Invention

The present invention relates to a secondary battery system for a hybrid system, an electric power generating system, and the like on which a secondary battery is mounted.

2. Description of the Related Art

For automobiles, rail vehicles, and the like, there has been known a hybrid system in which a rechargeable battery such as a lead acid battery, a nickel metal hydride battery, and a lithium battery is mounted, electric power obtained by a regeneration brake is charged to the rechargeable battery, and the electric power is utilized at the time of acceleration or the like, to thereby enhance fuel efficiency.

In addition, for an electric power generating system which utilizes natural energy, such as wind power generation and photovoltaic power generation, in order to convert largely varying natural energy into electricity, load leveling using a secondary battery system for storing electricity has been required in the case of connection with an electric power transmission system.

In the vehicles such as automobiles which adopt the hybrid system as described above or the electric power generating system including the secondary battery for storing electricity as described above, it is extremely important to know the deterioration state of the used secondary battery in order to maintain the energy efficiency of the entire system.

Therefore, technologies of presuming the deterioration state of the secondary battery have been proposed in the past. For example, Japanese Patent Laid-Open Publication No. 2003-129927 (Patent Document 1) discloses a method of measuring, for each engine start, a current flowing in the secondary battery and an open circuit voltage to thereby calculate a direct current resistance, and then calculating a state of health (SOH) of the secondary battery on the basis of the history of the direct current resistance.

Japanese Patent Laid-Open Publication No. 2007-55450 (Patent Document 2) discloses a technology in which a driving history including charge and discharge data of the secondary battery is transmitted to the outside, to thereby calculate, by a driving center, the deterioration state of the secondary battery mounted on the vehicle, and if the difference in calculation results of the deterioration state between the vehicle and the driving center exceeds a reference value, the driving center gives a modification instruction.

Further, Japanese Patent Laid-Open Publication No. 08-43505 (Patent Document 3) discloses that the remaining capacity of the secondary battery is calculated on the basis of the ratio of a direct current resistance at the time of discharge of the secondary battery to a direct current resistance at the time of charge thereof.

However, the direct current resistance of the secondary battery does not deteriorate at a constant rate, but is affected by a battery usage history and an environment state such as a total charge and discharge amount, a maximum current value, and a history of temperature at which the secondary battery has been stored.

Further, it is known that, if an excessively large current is repeatedly charged to and discharged from the secondary battery capacity in a short period of time, the life of the secondary battery considerably deteriorates.

Therefore, in the secondary battery system for the hybrid system, the wind power generating system, the photovoltaic power generating system, and the like which use the secondary battery, in order to suppress the deterioration of the secondary battery to the minimum, normally, it is common practice to limit the charge and discharge amount in a short period of time to, for example, approximately a few percent of the secondary battery capacity.

However, in the cases where a driving situation is rapidly changed, an abnormality in a charge and discharge management system occurs, and a secondary battery having a capacity which is excessively small compared with the used system is designed, a large current may be repeatedly charged to and discharged from the secondary battery capacity frequently and continuously for a long period of time. In such a case, there is fear that the life of the secondary battery considerably deteriorates.

This property is particularly remarkable when the secondary battery is a lithium ion battery.

The inventors of the present invention figured out the cause of this property as follows. Specifically, when a large current is charged to and discharged from the secondary battery capacity, separately from an irreversible increase in direct current resistance which decides an essential life of the secondary battery, even if the direct current resistance of the secondary battery temporarily increases, the direct current resistance decreases over time to recover. Further, if the charge and discharge is repeated again before the direct current resistance of the secondary battery which has temporarily increased sufficiently decreases, the life of the secondary battery considerably deteriorates.

That is, it was found out that, even if a large current is charged to and discharged from the secondary battery capacity to temporarily increase the direct current resistance of the secondary battery, if this direct current resistance of the secondary battery decreases to a certain degree, it is possible to effectively prevent the life of the secondary battery from considerably deteriorating, even if the charge and discharge is performed again.

However, according to the method disclosed in Japanese Patent Laid-Open Publication No. 2003-129927 (Patent Document 1), it is not possible to discriminate between the deterioration due to the transitional and temporary increase in direct current resistance as described above and the continuous deterioration over time, and hence the deterioration state of the secondary battery cannot be accurately detected. As a result, there is fear that the temporary deterioration of the direct current resistance is erroneously determined as the continuous deterioration over time, and that the life of the secondary battery is rapidly shortened by performing the charge and discharge before the recovery from the transitional increase in direct current resistance.

According to the method disclosed in Japanese Patent Laid-Open Publication No. 2007-55450 (Patent Document 2), a storage device for calculating the deterioration state on the basis of the driving history including the charge and discharge data and an arithmetic device for this calculation need to be provided to both of the vehicle and the driving center, and communication means between the vehicle and the driving center is also required. Accordingly, the system is high in cost and complicated. Further, the degree of progress of the deterioration is estimated on the basis of the rate of increase with respect to the direct current resistance of the secondary battery in its initial state. Accordingly, the temporary increase in direct current resistance of the secondary battery, which is caused by charging and discharging a large current as described above, is not considered.

Figure 4:
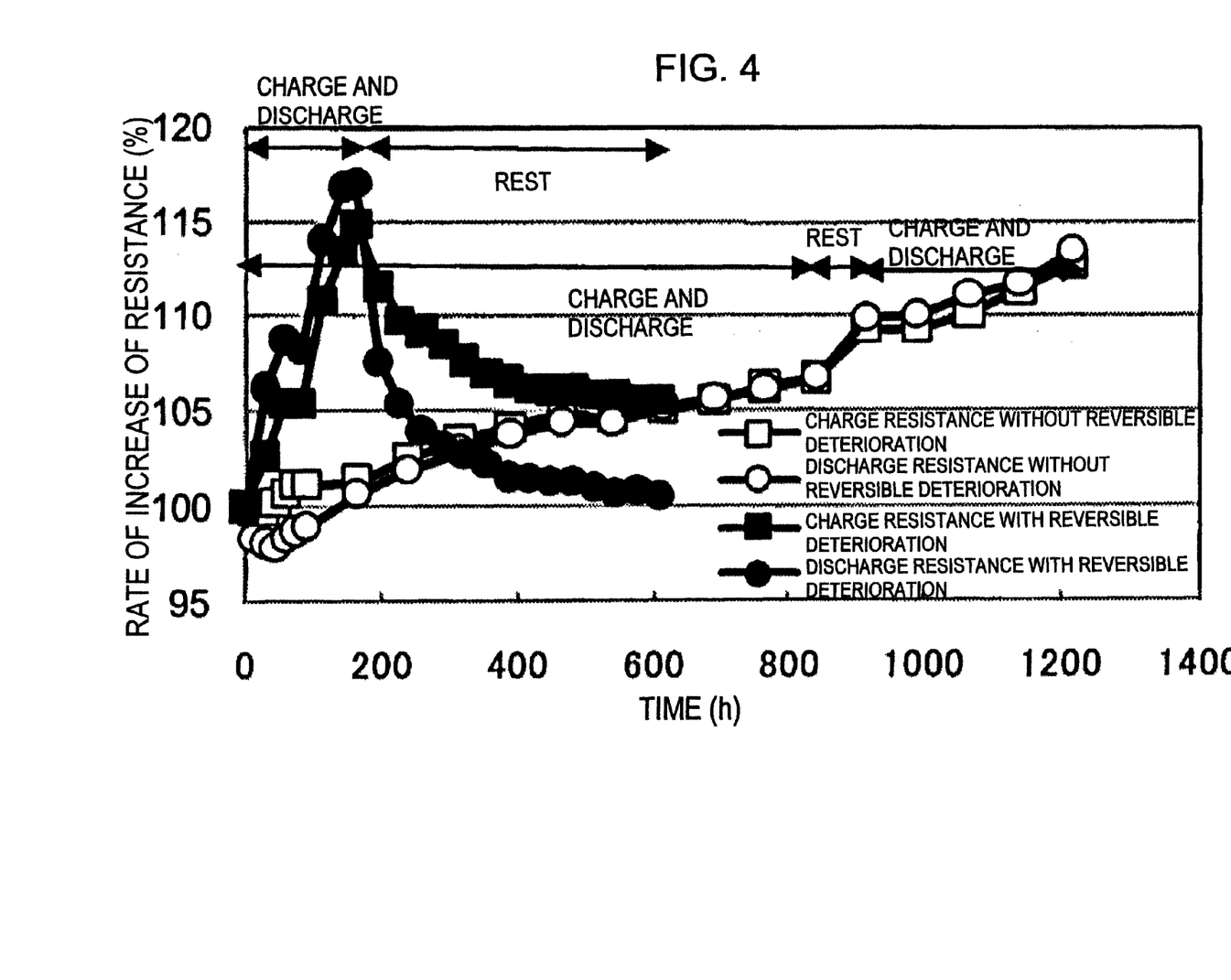
FIG. 4 is a graph showing a behavior of a rate of increase of the direct current resistance when the charge and discharge experiment is performed on the lithium ion secondary battery.

In addition, Japanese Patent Laid-Open Publication No. 08-43505 (Patent Document 3) discloses that the remaining capacity of the secondary battery is calculated on the basis of the ratio of the direct current resistance at the time of the discharge of the secondary battery to the direct current resistance at the time of the charge thereof. As shown in FIG. 4, the ratio of the discharge direct current resistance to the charge direct current resistance is constant independently of the deterioration state. Then, Japanese Patent Laid-Open Publication No. 08-43505 (Patent Document 3) evidently premises the use within a range in which a discharge current is a low current, and thus focuses on detecting the remaining capacity of the secondary battery on the basis of the ratio of the direct current resistance at the time of the discharge to the direct current resistance at the time of the charge. Accordingly, it is obvious that Japanese Patent Laid-Open Publication No. 08-43505 (Patent Document 3) does not assume the charge and discharge with a large current concerning a problem to be solved by the present invention.

In view of the above, the present invention has an object to simply detect, in a secondary battery system used in a hybrid system, a wind power generating system, a photovoltaic power generating system, and the like, the situation where a direct current resistance thereof transitionally (temporarily) increases, on the basis of the usage situation of a secondary battery, to thereby accurately calculate the deterioration state of the secondary battery and thus adopt an appropriate using method, so that the life of the secondary battery is extended.

SUMMARY OF THE INVENTION

In order to solve the above-mentioned problem, it was found out that a temporary increase in a direct current resistance of a secondary battery which occurs when a large current is charged to and discharged from a secondary battery capacity can be determined on the basis of the relation between the direct current resistance of the secondary battery at the time of discharge and the direct current resistance of the secondary battery at the time of charge, such as a value of the ratio of the two direct current resistances and the rate of increase thereof. Consequently, in the secondary battery system according to the present invention, the following technical means are taken. That is, (1) a secondary battery system includes: a battery controller which controls charge and discharge of a secondary battery; a total controller which controls the entire system; an ammeter which detects a charge current and a discharge current of the secondary battery; and a voltmeter which detects a voltage of the secondary battery. Further, the secondary battery system includes determination means for obtaining a direct current resistance of the secondary battery at the time of charge and a direct current resistance of the secondary battery at the time of discharge on the basis of a current value and a voltage value detected by the ammeter and the voltmeter, to thereby determine a temporary increase in the direct current resistance of the secondary battery caused by charge and discharge with a large current on the basis of a relation between the two obtained direct current resistances.

(2) In the above-mentioned secondary battery system, the determination means calculates a value of a ratio of the direct current resistance of the secondary battery at the time of the discharge to the direct current resistance of the secondary battery at the time of the charge (discharge resistance/charge resistance), and determines, when the calculated value of the ratio of the direct current resistances of the secondary battery decreases to be equal to or smaller than a predetermined value, the temporary increase in the direct current resistance of the secondary battery caused by the charge and discharge with a large current, and the total controller outputs, when the determination means determines the temporary increase in the direct current resistance of the secondary battery, a signal for stopping a use of the secondary battery for a given period via the battery controller, to thereby suspend the charge and discharge of the secondary battery.

(3) In the above-mentioned secondary battery system, the determination means determines, when the value of the ratio of the direct current resistances of the secondary battery is equal to or smaller than 1.05, the temporary increase in the direct current resistance of the secondary battery caused by the charge and discharge with a large current.

(4) In the above-mentioned secondary battery system, the determination means calculates a difference between a rate of increase of the direct current resistance of the secondary battery at the time of the discharge and a rate of increase of the direct current resistance of the secondary battery at the time of the charge, and determines, when the calculated difference becomes a negative value equal to or smaller than a predetermined value, the temporary increase in the direct current resistance of the secondary battery caused by the charge and discharge with a large current, and the total controller outputs, when the determination means determines the temporary increase in the direct current resistance of the secondary battery, a signal for stopping a use of the secondary battery for a given period via the battery controller, to thereby suspend the charge and discharge of the secondary battery.

(5) The above-mentioned secondary battery system is a hybrid system including an engine, an electric power generator, a motor, a secondary battery, a battery controller which controls charge and discharge of the secondary battery, and a total controller which controls the entire system, and the total controller outputs, when the determination means determines the temporary increase in the direct current resistance of the secondary battery caused by the charge and discharge with a large current, a signal for stopping a use of the secondary battery for a given period via the battery controller, to thereby suspend the charge and discharge of the secondary battery.

(6) The hybrid system is a hybrid system which is applied to means of transportation used on a day-to-day basis, and when the signal for stopping the use of the secondary battery for the given period is outputted, a period of the stop includes a nighttime rest of the means of transportation.

(7) Measurement of the direct current resistance of the secondary battery at the time of the charge and the direct current resistance of the secondary battery at the time of the discharge, and calculation of the ratio of the two measured direct current resistances or the difference between the rates of increase thereof are carried out after the secondary battery has been rested for a given period.

(8) The above-mentioned secondary battery system is an electric power generating system including: an electric power generating unit which utilizes natural energy; a secondary battery; a battery controller which controls charge and discharge of the secondary battery; and a total controller which controls the entire system, and the total controller outputs, when the determination means determines the temporary increase in the direct current resistance of the secondary battery caused by the charge and discharge with a large current, a signal for stopping a use of the secondary battery for a given period via the battery controller, to thereby suspend the charge and discharge of the secondary battery.

(9) The above-mentioned secondary battery system is a secondary battery system including: a plurality of secondary batteries; a plurality of battery controllers which control the respective secondary batteries; and a total controller which controls the entire system, and the secondary battery system includes the determination means for obtaining, for each of the plurality of secondary batteries, the direct current resistance of the secondary battery at the time of the charge and the direct current resistance of the secondary battery at the time of the discharge on the basis of the current value and the voltage value detected by the ammeter and the voltmeter, to thereby determine the temporary increase in the direct current resistance of the secondary battery caused by the charge and discharge with a large current on the basis of the relation between the two obtained direct current resistances.

(10) The plurality of secondary batteries are periodically brought into a resting state one after another.

(11) The plurality of secondary batteries include two types of secondary batteries having different characteristics.

According to the present invention, without adding any special hardware, it becomes possible to simply and accurately detect the temporary increase in the direct current resistance of the secondary battery caused by charging and discharging a large current to and from the secondary battery capacity, on the basis of the relation between the direct current resistance of the secondary battery at the time of the charge and the direct current resistance of the secondary battery at the time of the discharge. Accordingly, even if such a temporary increase in the direct current resistance of the secondary battery, which largely affects the life of the secondary battery, occurs, the secondary battery can be properly managed.

That is, if it is possible to accurately detect that a large current is charged to and discharged from the secondary battery capacity as described above, an appropriate coping process thereagainst is encouraged, to thereby make it possible to extend the life of the secondary battery. As the appropriate coping process, the charge and discharge of the secondary battery is prohibited for a rest until the direct current resistance of the secondary battery which has temporarily increased decreases to some degree. Alternatively, for example, in the case where a plurality of secondary batteries are used and a part of the secondary batteries can be replaced, only the secondary battery to and from which a large current is charged and discharged is replaced.

The present invention is particularly effectively applied to: a hybrid system which is applied to means of transportation used on a day-to-day basis, such as an automobile and a railway; or an electric power generating system which utilizes natural energy, such as a wind power generating system and a photovoltaic power generating system.

Further, according to the present invention, it becomes possible to judge an abnormality of the battery controller and the total controller which controls the entire system or a design error of the secondary battery capacity in the system, on the basis of a frequency at which a large current is charged to and discharged from the secondary battery capacity, to thereby adopt an appropriate coping process such as repairs or an increase in the capacity of the secondary battery.

DETAILED DESCRIPTION OF THE PREFERRED EMBODIMENTS

Embodiments of the present invention are described below with reference to the drawings.

EMBODIMENTS

Embodiment 1

Figure 1:
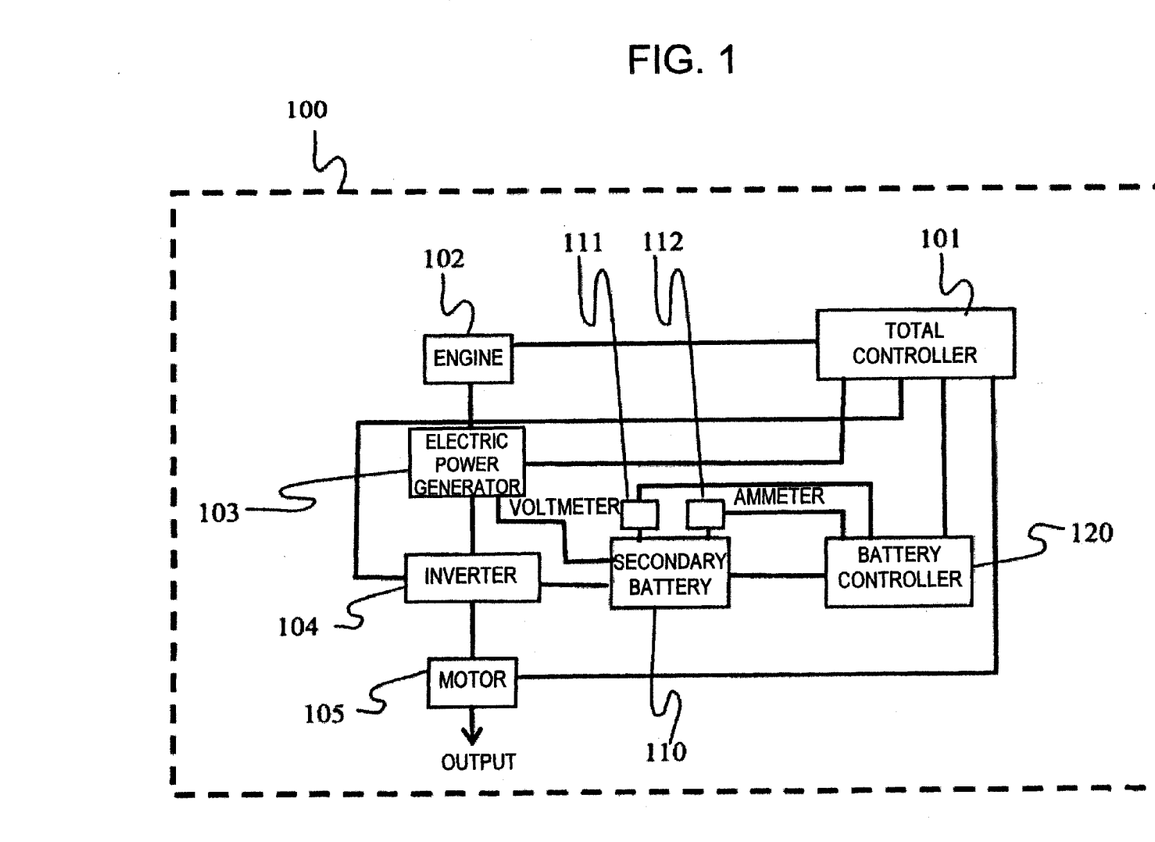
FIG. 1 is a configuration diagram illustrating a hybrid system according to Embodiment 1.

In the present embodiment, the present invention is applied to a hybrid system for automobiles, and a system configuration diagram is illustrated in FIG. 1. A hybrid system 100 includes an engine 102, an electric power generator 103, an inverter 104, a motor 105, a total controller 101, a secondary battery 110, a voltmeter 111, an ammeter 112, and a battery controller 120. An output of the engine 102 is converted into electric power by the electric power generator 103, and is connected to the motor 105 via the inverter 104. In addition, the secondary battery 110 is also connected to the motor 105 via the inverter 104.

The battery controller 120 calculates the state of the secondary battery and the upper limit value of electric power which can be charged and discharged, by means of the voltmeter 111, the ammeter 112, and the like connected to the secondary battery 110, and outputs the results to the total controller 101.

In the hybrid system 100, at the time of acceleration or an upward slope, the motor 105 is rotated for operation by outputs from the engine 102 and the secondary battery 110, and at the time of deceleration or downward slope driving, regeneration electric power is charged to the secondary battery 110 while decelerating by a friction brake (not shown) and a regeneration brake of the motor 105. In this way, the electric power energy which is obtained at the time of the decrease in kinetic energy or potential energy of a vehicle is released at the time of the increase in kinetic energy or potential energy, and thus is used as a substitute for part of the output of the engine 102, whereby fuel efficiency enhancement is realized.

It should be noted that a chargeable and dischargeable amount, a temperature, and a voltage of the secondary battery 110 are limited, and hence it is necessary to control the secondary battery 110 to fall within a predetermined charge and discharge range, a predetermined temperature range, and a predetermined voltage range. Therefore, when the charge amount and the voltage exceed the upper limits thereof, the charge needs to be stopped. Conversely, when the discharge amount and the voltage fall below the lower limits thereof, the discharge needs to be stopped. In addition, the temperature of the secondary battery 110 rises due to heat generated by the charge and the discharge, and an excessively high temperature accelerates the deterioration of the secondary battery 110. Therefore, when the temperature exceeds the upper limit thereof, the charge and discharge needs to be stopped until the temperature drops.

It should be noted that, at the time of the charge, the voltage of the secondary battery 110 increases by the product of a direct current resistance and a current from the battery voltage, and at the time of the discharge, the voltage of the secondary battery 110 decreases by the product of the direct current resistance and the current from the battery voltage. Therefore, as the direct current resistance is larger, the voltage fluctuation range at the time of the charge and discharge becomes larger, and the charge and discharge efficiency of electrical energy becomes lower.

It is known that, as described above, in addition to the component which gradually increases due to the deterioration over time caused by storage or charge and discharge within a normal range, the direct current resistance of the secondary battery 110 further increases if a current equal to or larger than a given value dependent on characteristics of the secondary battery 110 is repeatedly charged and discharged continuously for a given period of time or longer.

This increase amount has a property of gradually recovering by leaving the secondary battery 110 with the charge and discharge being stopped.

Figure 2:
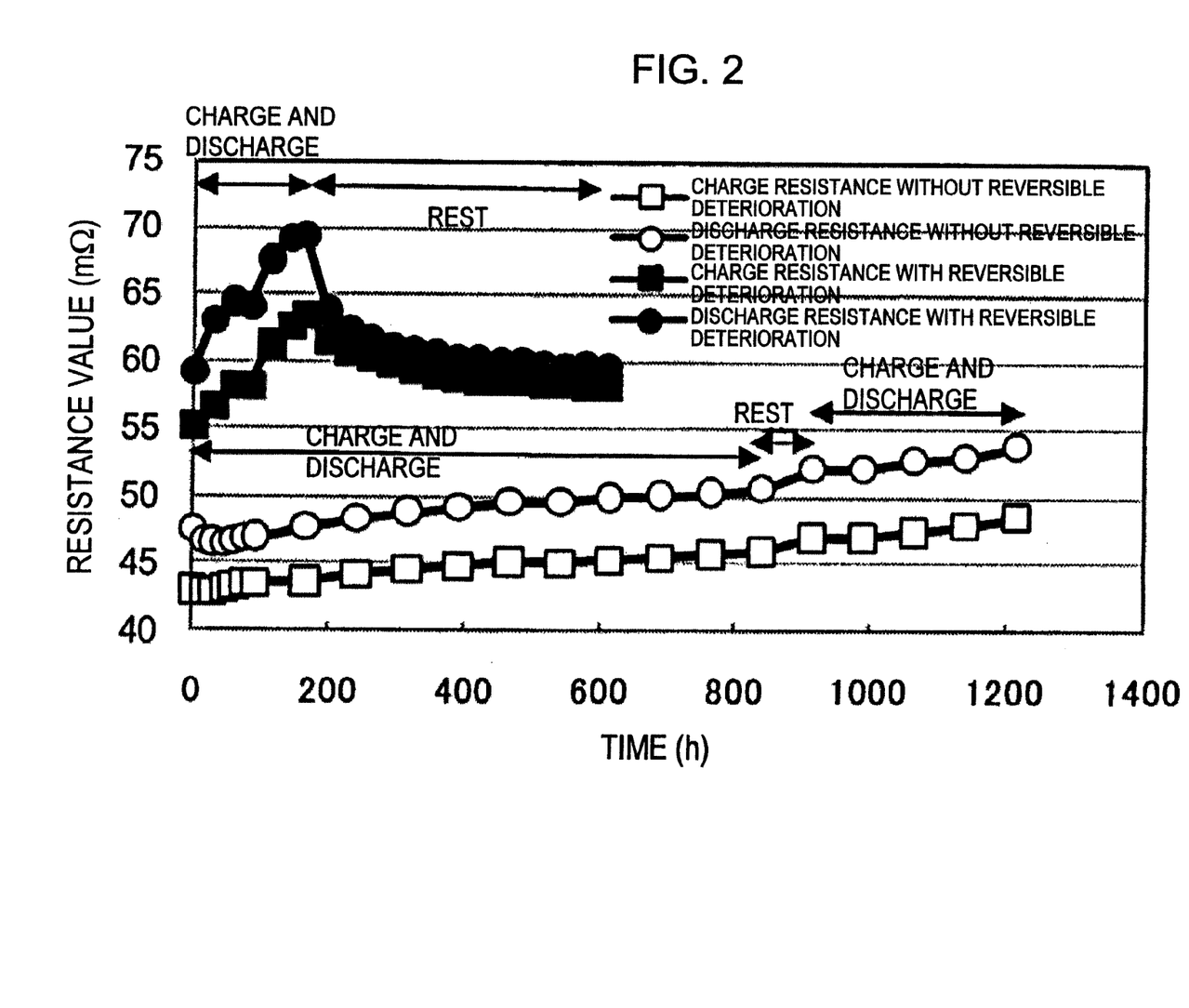
FIG. 2 is a graph showing a behavior of a direct current resistance value when a charge and discharge experiment is performed on a lithium ion secondary battery.

An example for this is shown in FIG. 2. FIG. 2 shows a behavior of the increase in resistance when a charge and discharge experiment is performed on two lithium ion secondary batteries at different current densities.

Black plots represent results which are obtained when the charge and discharge experiment is performed on the capacity of the secondary battery at a high current density. Further, square plots represent a temporal change in the charge direct current resistance (the direct current resistance of the secondary battery measured at the time of the charge of the secondary battery), and circular plots represent a temporal change in the discharge direct current resistance (the direct current resistance of the secondary battery measured at the time of the discharge). These plots represent the temporal changes in the direct current resistance when the charge and discharge experiment is performed for about 200 hours and the secondary battery 110 is then left in a resting state.

The experiment results show that, when the charge and discharge experiment is performed on the capacity of the secondary battery at a high current density, the direct current resistance rapidly increases during the charge and discharge, but the resistance value recovers during the resting period after a lapse of about 200 hours. It should be noted that, in the present embodiment, a lithium ion secondary battery in which: a layered oxide material using Ni, Mn, and Co (LiNi0.3Mn0.3Co0.3O2) is used as a positive electrode active material; and hard carbon is used as a negative electrode active material, is used as the secondary battery 110.

On the other hand, white plots represent results which are obtained when the charge and discharge experiment is performed on the capacity of the secondary battery at a low current density. Further, square plots represent a temporal change in the charge direct current resistance, and circular plots represent a temporal change in the discharge direct current resistance. These plots represent the temporal changes in the direct current resistance when the charge and discharge experiment is performed for about 800 hours, the secondary battery 110 is then left in a resting state for about 50 hours, and after that, the charge and discharge experiment is performed again, which assumes a general usage situation.

The results in this case show that both of the charge direct current resistance and the discharge direct current resistance slowly increase along with the charge and discharge, do not recover even during the resting period, and then slowly increase again at the time of the second charge and discharge. In general, such an increase in direct current resistance decides an essential life of the secondary battery. Therefore, as described above, the charge and discharge amount required by a system which adopts the secondary battery has been conventionally designed so as to be a few percents of the capacity of the secondary battery in terms of a change in a short period of time, to thereby secure the life of the secondary battery.

It should be noted that the reason why the resistance values in the above two measurement results (two batteries) are different from each other is that electrode areas are different, and electrode materials and electrolyte solutions are the same.

As described above, the increase in the direct current resistance of the lithium ion secondary battery includes: the slow increase at the time of the charge and discharge with a low current, which does not recover (hereinafter, referred to as irreversible resistance increase); and the rapid and transitional increase due to the charge and discharge with a large current (hereinafter, referred to as reversible resistance increase).

As described above, from the point of view of securing the life of the secondary battery, the usage range of a normally expected charge and discharge current is set to a region in which the reversible resistance increase does not occur. However, in the cases where a driving situation is rapidly changed, an abnormality in a charge and discharge management system occurs, and a secondary battery having a capacity which is excessively small compared with the used system is designed, the usage range may reach a region of the reversible resistance increase depending on the usage of the secondary battery.

Although this rapid increase in direct current resistance is reversible, it is confirmed by the experiments that, if a period of time of the charge and discharge with a large current is long, a reversible recovery amount becomes smaller, so that the deterioration is accelerated and the recovery takes a long time. In particular, if the charge and discharge with a large current is repeated in the state where the recovery amount of the direct current resistance is not sufficient, the life of the secondary battery is rapidly shortened.

Therefore, it is necessary to detect as soon as possible the usage state with such a large current beyond expectation, and suspend the use of the secondary battery, to thereby recover the deterioration state.

For this purpose, in the present embodiment, the ratio of the charge direct current resistance to the discharge direct current resistance of the secondary battery is focused on.

That is, as described above, FIG. 2 shows the charge direct current resistance and the discharge direct current resistance at the time of each experiment. The experiment results show as follows. Specifically, in the case of the experiment using a large current in which the reversible increase deterioration of the direct current resistance occurs, as indicated by the black square plots representing the charge direct current resistance and by the black circular plots representing the discharge direct current resistance, the charge direct current resistance and the discharge direct current resistance during the charge and discharge experiment period rapidly increase at the respective ratios of increase while exhibiting different values from each other. Then, at the start of the resting state, particularly the discharge direct current resistance rapidly decreases in a short period of time. After a lapse of about 200 hours from the start of the resting state, both of the resistances recover to have substantially the same value.

On the other hand, in the case of the experiment using a low current in which the reversible increase deterioration of the direct current resistance does not occur, the discharge direct current resistance and the charge direct current resistance exhibit different values from each other throughout before and after the resting state and during the charge and discharge period, and increase at a substantially constant and slow rate of increase even before and after the resting state.

Figure 3:
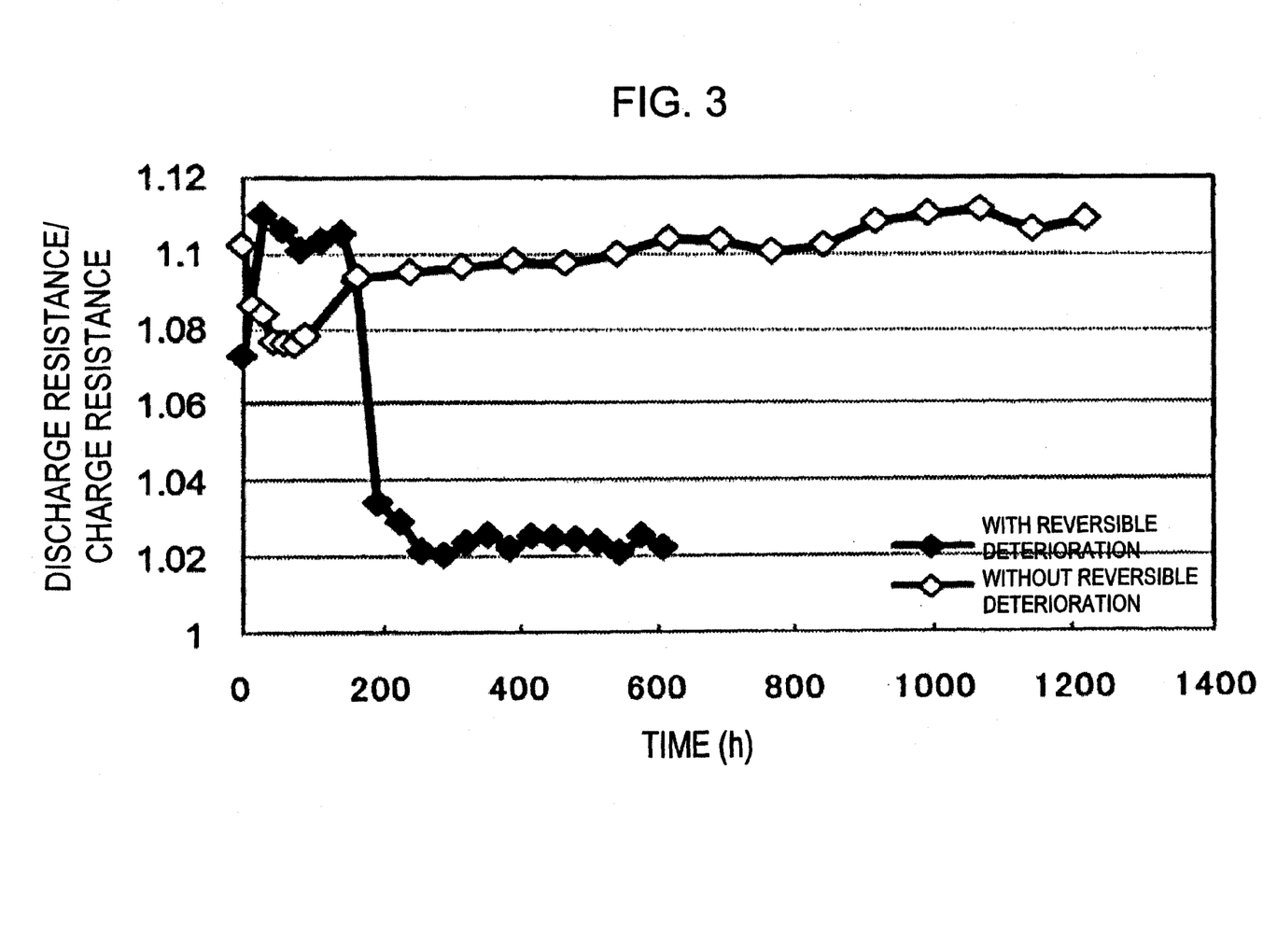
FIG. 3 is a graph showing a ratio of a discharge direct current resistance to a charge direct current resistance when the charge and discharge experiment is performed on the lithium ion secondary battery.

Then, FIG. 3 shows the ratio of the discharge direct current resistance to the charge direct current resistance (discharge resistance/charge resistance) at the time of the reversible resistance increase and the irreversible resistance increase in FIG. 2.

In the experiment in which the reversible resistance increase occurs (black rhombic plots), it can be understood that the value of the ratio rapidly increases immediately after the start of the charge and discharge, and when the charge and discharge is ended and the resting period starts, the value of the ratio rapidly decreases from about 1.1 to about 1.02.

In contrast to this, in the experiment in which the irreversible resistance increase occurs (white rhombic plots), it can be understood that the value of the ratio temporarily decreases from about 1.1 to 1.07 immediately after the start of the experiment, and then slowly increases to finally reach about 1.11.

As described above, the change characteristic of the ratio of the discharge direct current resistance to the charge direct current resistance can be clearly discriminated between the time of the reversible resistance increase and the time of the irreversible resistance increase. Accordingly, the ratio of the discharge direct current resistance to the charge direct current resistance is measured, to thereby make it possible to accurately detect that the secondary battery is used with a charge and discharge current which is so high as to cause the reversible resistance increase.

Specifically, in the present embodiment, the voltmeter 111 and the ammeter 112 are used to measure a voltage and a current, and the battery controller 120 calculates the discharge direct current resistance, the charge direct current resistance, and the ratio thereof on the basis of the measurement results.

Then, in the case where the value of this ratio rapidly decreases from the previous value, for example, becomes equal to or smaller than 1.05 which is smaller than 1.07, it is regarded that the reversible resistance increase obviously occurs. As a result, the battery controller 120 transmits a signal for stopping the use of the secondary battery 110 for a given period to the total controller 101, and the total controller 101 receives the signal from the battery controller 120, and stops the use of the secondary battery 110 in the hybrid system 100, to thereby set a mode in which a vehicle is driven only by the output of the engine 102 during the given period.

This brings the secondary battery into the resting state, achieves the recovery of the reversible resistance increase, and suppresses the deterioration acceleration of the secondary battery 110.

Here, in the case where the hybrid system 100 has a structure in which a plurality of the secondary batteries 110 are used and each of the secondary batteries 110 can be easily detached and replaced, the battery controller 120 may identify a secondary battery 110 in which the reversible resistance increase occurs, and in response to this, the total controller 101 may make a display indicating the replacement of the corresponding secondary battery 110, to thereby encourage a user to replace the secondary battery.

In this case, the hybrid system 100 can continue a fuel-efficient hybrid operation using the secondary batteries 110 without resting the secondary batteries.

It should be noted that, as is apparent from FIGS. 2 and 3, the change of the ratio of the discharge direct current resistance to the charge direct current resistance remarkably appears during the resting state which continues for a predetermined period of time, after the end of the charge and discharge in which the reversible resistance increase occurs. Accordingly, the change of this ratio may be calculated and judged not immediately after the end of the charge and discharge but after a given resting period.

In the present embodiment, the hybrid system 100 is mounted on an automobile, and thus normally does not operate during nighttime, which corresponds to the resting period during which the charge and discharge is not performed.

Therefore, on the basis of the ratio of the discharge direct current resistance to the charge direct current resistance which is recorded on the previous day, the charge and discharge of the secondary battery may be suspended in consideration of the resting period during nighttime after the operation start of the next day. Alternatively, the ratio of the discharge direct current resistance to the charge direct current resistance may be calculated at the time of activation (at the engine start of the automobile) every morning, it may be judged whether or not the reversible resistance increase has occurred, and it may be judged whether or not the charge and discharge needs to be suspended.

It should be noted that the present embodiment is premised on the mounting on an automobile having the hybrid system mounted thereon, but also in the case of the mounting on a rail vehicle, similarly, the operation is normally stopped during nighttime, and hence the same processing may be performed.

In addition, the calculation of the ratio of the discharge direct current resistance to the charge direct current resistance may be carried out at the same time as the normal deterioration state detection of the secondary battery 110 as in Japanese Patent Laid-Open Publication No. 2003-129927 (Patent Document 1). This makes it possible to more accurately detect the deterioration state of the secondary battery 110.

As described above, in the present embodiment, with the use of a simple configuration of detecting the ratio of the discharge direct current resistance to the charge direct current resistance of the secondary battery, which does not require the addition of special hardware such as an additional recording device or communication device, it is possible to extremely accurately detect that the secondary battery is used with a large current beyond normal expectation. Then, the charge and discharge is suspended, to thereby make it possible to effectively suppress the deterioration of the secondary battery.

Further, after the use with a large current beyond normal expectation, appropriate using method and coping process are encouraged, to thereby make it possible to extend the life of the secondary battery.

Embodiment 2

In order to judge the reversible resistance increase, in Embodiment 1, the change characteristic of the ratio of the discharge direct current resistance to the charge direct current resistance is utilized, and on the other hand, in the present embodiment, the rates of increase of the discharge direct current resistance and the charge direct current resistance are focused on.

That is, the values of the discharge direct current resistance and the charge direct current resistance in FIG. 2 are shown in FIG. 4 as the rates of increase when the values before the start of the experiment are assumed as 100%. Black plots represent results which are obtained when the charge and discharge experiment is performed on the capacity of the secondary battery at a high current density. Further, square plots represent a temporal change in the rate of increase of the charge direct current resistance, and circular plots represent a temporal change in the rate of increase of the discharge direct current resistance.

In addition, white plots represent results which are obtained when the charge and discharge experiment is performed on the capacity of the secondary battery at low current density. Further, square plots represent a temporal change in the rate of increase of the charge direct current resistance, and circular plots represent a temporal change in the rate of increase of the discharge direct current resistance.

The graph layout as described above shows that the rates of increase of the discharge direct current resistance and the charge direct current resistance are substantially the same as each other, except for the resting period after the charge and discharge is performed on the capacity of the secondary battery at a high current density and the reversible resistance increase thus occurs. Accordingly, FIG. 5 shows a difference with time between the rate of increase of the discharge direct current resistance and the rate of increase of the charge direct current resistance in FIG. 4.

Black rhombic plots represent a difference with time between the rate of increase of the discharge direct current resistance and the rate of increase of the charge direct current resistance when the charge and discharge experiment is performed on the capacity of the secondary battery at a high current density. White rhombic plots represent a difference with time between the rate of increase of the discharge direct current resistance and the rate of increase of the charge direct current resistance when the charge and discharge experiment is performed on the capacity of the secondary battery at a low current density.

Figure 5:
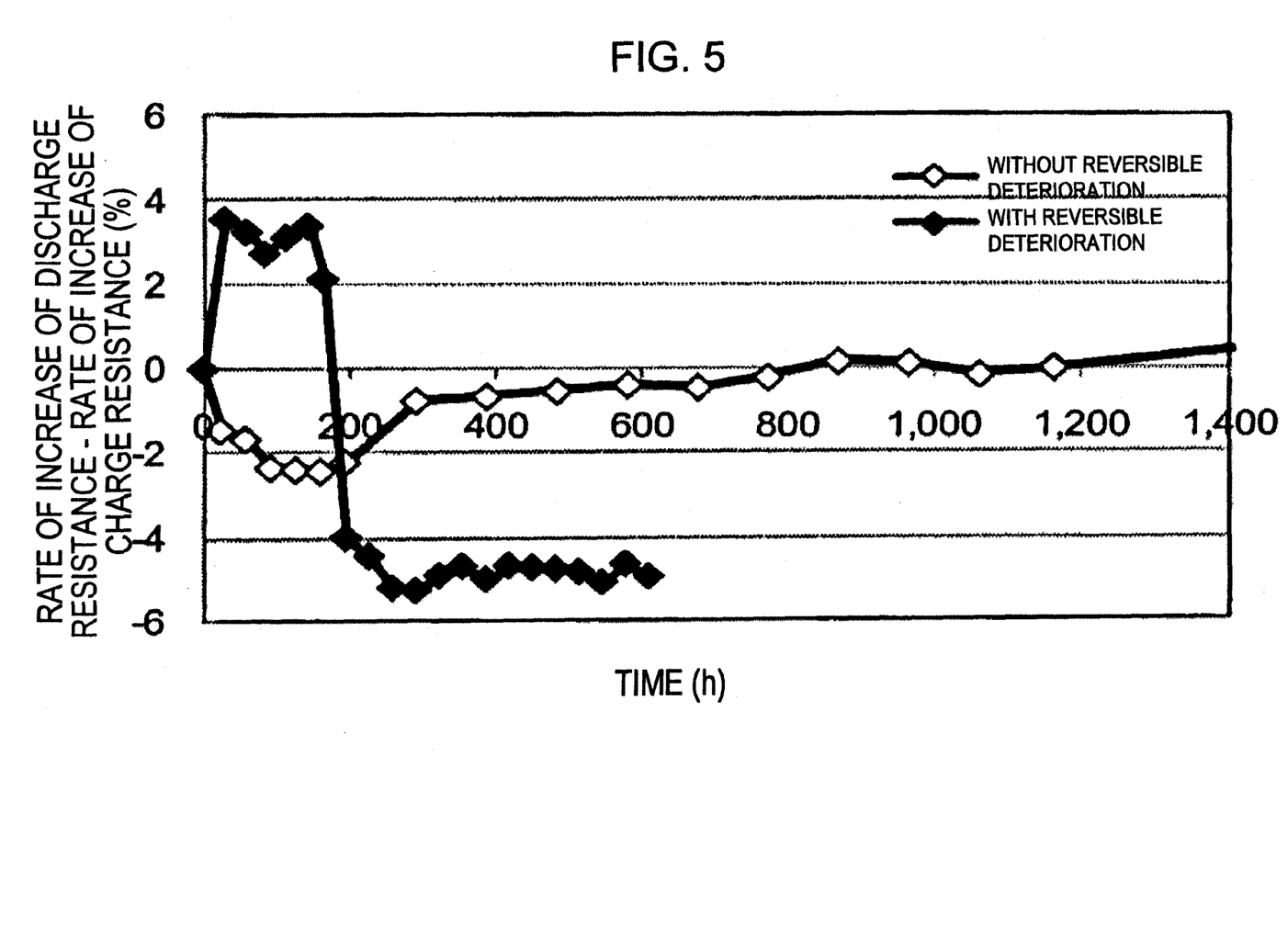
FIG. 5 is a graph showing a difference between a rate of increase of the discharge direct current resistance and a rate of increase of the charge direct current resistance when the charge and discharge experiment is performed on the lithium ion secondary battery.

As is apparent from FIG. 5, the different between the rate of increase of the discharge direct current resistance and the rate of increase of the charge direct current resistance is a negative value equal to or smaller than −4% during the resting period after the reversible resistance increase has occurred, and this makes it possible to accurately discriminate the reversible resistance increase.

It should be noted that, although the different between the rate of increase of the discharge direct current resistance and the rate of increase of the charge direct current resistance also exhibits a negative value at an early stage of the charge and discharge experiment with a low current, this is an influence of insufficient initializing charge and discharge of the battery, and thus normally does not occur.

In the present embodiment, the battery controller 120 calculates the above-mentioned difference between the rate of increase of the discharge direct current resistance and the rate of increase of the charge direct current resistance, whereby the use with a large current beyond a normal usage range is detected. Similarly to Embodiment 1, the simple configuration as described above makes it possible to detect that the secondary battery is used in a range beyond normal expectation. Then, the charge and discharge is suspended, to thereby make it possible to suppress the deterioration of the secondary battery. Other configurations, detection timing of the ratio of the discharge direct current resistance to the charge direct current resistance of the secondary battery, rest timing thereof, and the like are the same as those of Embodiment 1.

In this way, the deterioration state of the secondary battery can be accurately calculated, and an appropriate using method is applied, to thereby make it possible to extend the life of the secondary battery.

Embodiment 3

In the present embodiment, description is given of an example in which the present invention is applied to a hybrid system for automobiles which operates a regeneration brake at the time of deceleration or downward slope driving.

Figure 6:
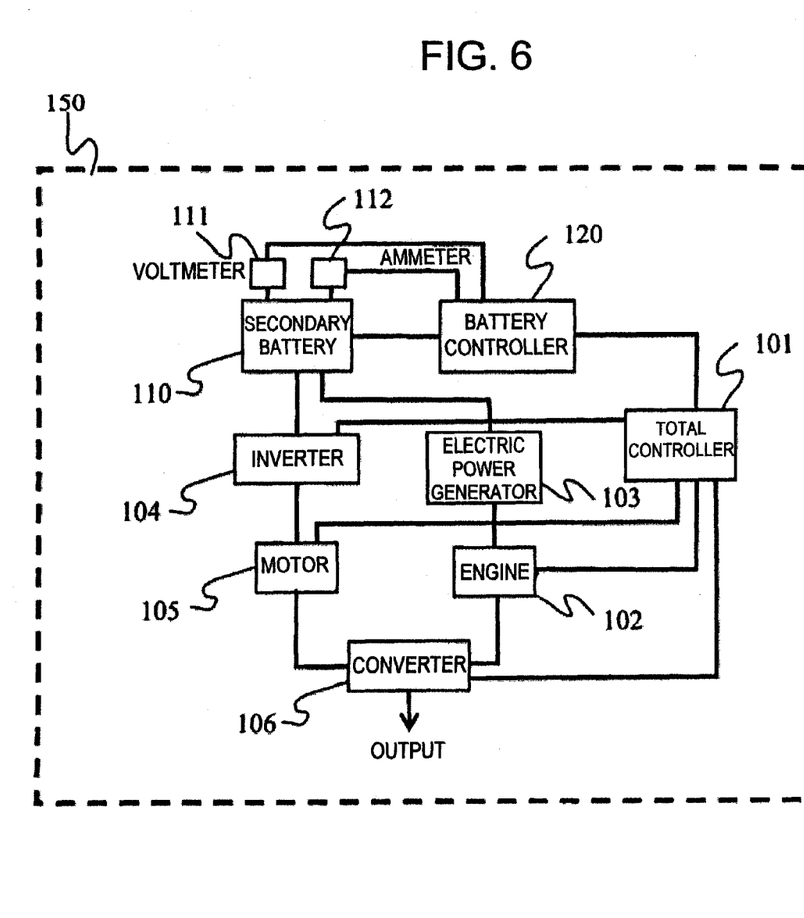
FIG. 6 is a configuration diagram illustrating a hybrid system according to Embodiment 3.

FIG. 6 is a configuration diagram illustrating the hybrid system according to the present embodiment. A hybrid system 150 includes the engine 102, the electric power generator 103, the inverter 104, the motor 105, the total controller 101, the secondary battery 110, the voltmeter 111, the ammeter 112, the battery controller 120, and a converter 106. An output from the secondary battery 110 is connected to the motor 105 via the inverter 104. An output of the motor 105 is outputted as the power for driving a vehicle or the like, via the converter 106 together with an output of the engine 102.

Here, the converter 106 adjusts the ratio of the output of the engine 102 to the output of the motor 105, and performs such a control that the efficiency is improved within ranges of the respective outputs. An extra output of the engine 102 is converted into electric power by the electric power generator 103 to be charged to the secondary battery 110.

Also in the hybrid system 150 of the present embodiment, at the time of acceleration or an upward slope, the motor 105 is rotated for operation by outputs from the engine 102 and the secondary battery 110, and at the time of deceleration or downward slope driving, regeneration electric power is charged to the secondary battery 110 while decelerating by a friction brake (not shown) and a regeneration brake of the motor 105. In this way, the electric power energy which is obtained at the time of the decrease in kinetic energy or potential energy of a vehicle is released at the time of the increase in kinetic energy or potential energy, and thus is used as a substitute for part of the output of the engine 102, whereby fuel efficiency enhancement is realized.

It should be noted that, also in the present embodiment, the battery controller 120 calculates the state of the secondary battery 110 and the upper limit value of electric power which can be charged and discharged, by means of the voltmeter 111, the ammeter 112, and the like connected to the secondary battery 110, and outputs the results to the total controller 101. Further, the ratio of the discharge direct current resistance to the charge direct current resistance of the secondary battery 110 is detected, and it is detected whether or not the secondary battery 110 is in a temporary deterioration state due to the charge and discharge with a large current. Other configurations, detection timing of the ratio of the discharge direct current resistance to the charge direct current resistance of the secondary battery, rest timing thereof, and the like are the same as those of Embodiment 1.

As described above, also in the present embodiment, with the use of a simple configuration of detecting the ratio of the discharge direct current resistance to the charge direct current resistance of the secondary battery, it is possible to detect that the secondary battery is used with a large current beyond normal expectation. Then, the charge and discharge is suspended, to thereby make it possible to suppress the deterioration of the secondary battery.

In this way, the deterioration state of the secondary battery can be accurately calculated, and an appropriate using method is applied, to thereby make it possible to extend the life of the secondary battery.

Embodiment 4

In the present embodiment, description is given of an example in which the present invention is applied to a wind power generating system.

Figure 7:
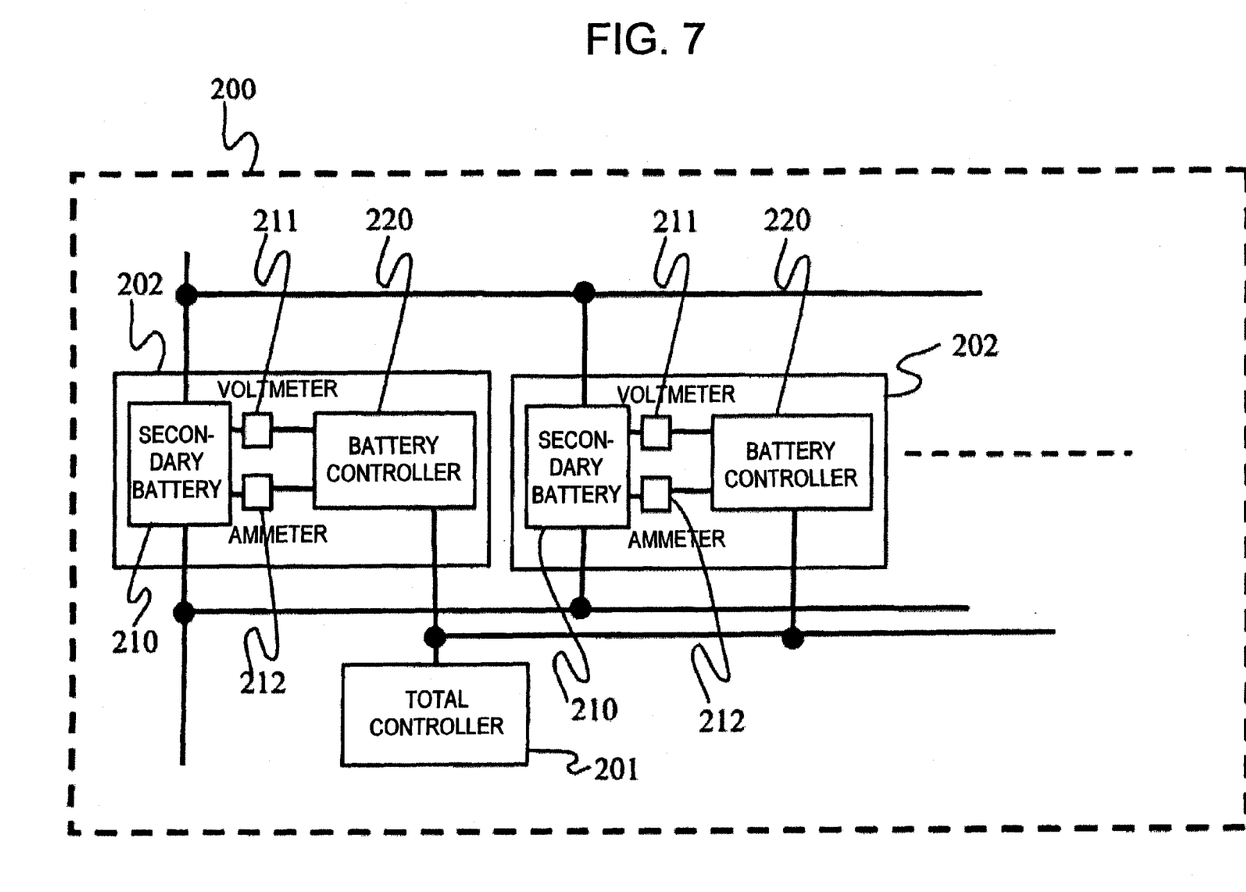
FIG. 7 is a configuration diagram illustrating a secondary battery system according to Embodiment 4.

FIG. 7 is a configuration diagram illustrating a secondary battery system according to the present embodiment. A secondary battery system 200 includes a plurality of secondary battery units 202 and a total controller 201, and each of the secondary battery units 202 includes a secondary battery 210, a voltmeter 211, an ammeter 212, and a battery controller 220.

The battery controller 220 calculates the state of the secondary battery 210 and the upper limit value of electric power which can be charged and discharged, by means of the voltmeter 211, the ammeter 212, and the like connected to the secondary battery 210, and outputs the results to the total controller 201.

The secondary battery system 200 is installed in combination with a wind power generator, and is set so as to perform leveling on electric power with pulsations which is inputted from the wind power generator, and output constant electric power. In addition, the secondary battery system 200 is also set so as to store electric power during nighttime with low electric power consumption, and release electric power during daytime with high electric power consumption.

Also in the secondary battery 210 used for the purpose as described above, a chargeable and dischargeable amount, a temperature, and a voltage thereof are limited in terms of its usage range, and hence it is necessary to control the secondary battery 210 to fall within a predetermined charge and discharge range, a predetermined temperature range, and a predetermined voltage range. Therefore, when the charge amount and the voltage exceed the upper limits thereof, the charge needs to be stopped. Conversely, when the discharge amount and the voltage fall below the lower limits thereof, the discharge needs to be stopped. This is the same as in Embodiment 1.

Particularly in the wind power generating system, the amount of electric power generation is largely affected by the weather, and the electric power consumed by electric power supply ends largely changes for each hour and each season. As a result, the charge and discharge amount of the secondary battery used by this system largely changes.

Therefore, also in the present embodiment, similarly to Embodiment 1, the battery controller 220 calculates the state of the secondary battery 210 and the upper limit value of electric power which can be charged and discharged, by means of the voltmeter 211, the ammeter 212, and the like connected to the secondary battery 210, and outputs the results to the total controller 201. Further, similarly to Embodiment 1, the ratio of the discharge direct current resistance to the charge direct current resistance of the secondary battery 210 is detected, and it is detected whether or not the secondary battery 210 is in a temporary deterioration state due to the occurrence of the reversible resistance increase caused by the charge and discharge with a large current.

In the present embodiment, unlike Embodiment 1, the charge and discharge of the secondary battery 210 does not stop during nighttime, and hence the resting period does not exist on a day-to-day basis. Accordingly, the ratio of the discharge direct current resistance to the charge direct current resistance after the resting period cannot be detected and measured every morning.

Therefore, the following method is adopted. That is, the resting period is sequentially set to the plurality of secondary battery units 202 one after another for each given period, and the ratio of the discharge direct current resistance to the charge direct current resistance is detected at the end of each resting period.

Then, if it is detected that the secondary battery 210 is in the temporary deterioration state due to the charge and discharge with a large current, the battery controller 220 of the corresponding secondary battery unit 202 transmits a signal for resting this secondary battery 210 for a given period to the total controller 201. After that, the total controller 201 disconnects the corresponding secondary battery unit 202 from the secondary battery system 200 for a given period, to thereby prevent the corresponding secondary battery unit 202 from being charged and discharged.

It should be noted that, in the case where the secondary battery unit 202 and the secondary battery 210 are configured to be easily replaceable, the total controller 201 may display the corresponding secondary battery unit 202 and the corresponding secondary battery 210 as a replacement target to a user, to thereby maintain predetermined performance by such replacement.

As described above, also in the present embodiment, with the use of a simple detection method of detecting the ratio of the discharge direct current resistance to the charge direct current resistance of the secondary battery, it is possible to detect that the secondary battery is used with a large current beyond normal expectation. Then, the charge and discharge is suspended, to thereby make it possible to suppress the deterioration of the secondary battery.

In this way, the deterioration state of the secondary battery can be accurately calculated, and appropriate coping process and using method are encouraged, to thereby make it possible to extend the life of the secondary battery.

In the present embodiment, the present invention is applied to the wind power generating system, but it goes without saying that the present invention can be applied to various electric power generating systems which utilize natural energy, such as a photovoltaic power generating system using solar panels.

Embodiment 5

In the present embodiment, description is given of an example in which the present invention is applied to a system using a plurality of secondary batteries having different characteristics, particularly, a wind power generating system.

Figure 8:
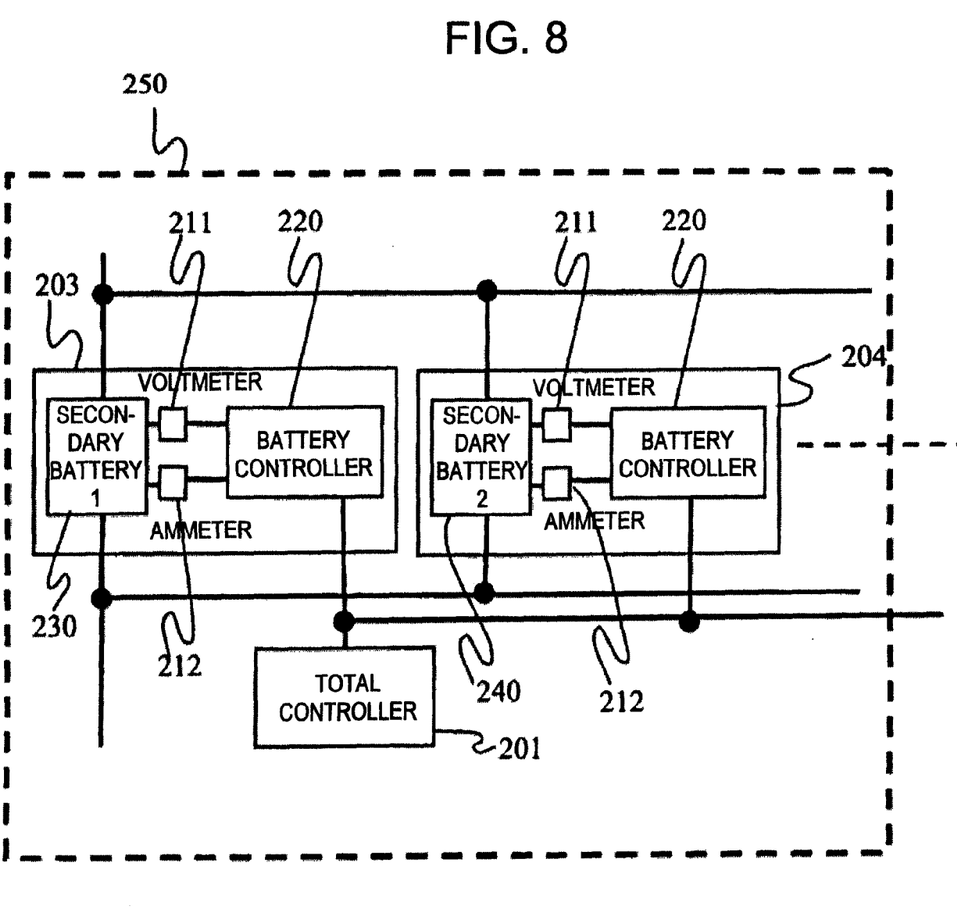
FIG. 8 is a configuration diagram illustrating a secondary battery system according to Embodiment 5.

FIG. 8 is a configuration diagram illustrating a secondary battery system according to the present embodiment. The secondary battery system 250 includes: two types of secondary battery units having different characteristics, that is, a first secondary battery unit 203 and a second secondary battery unit 204; and the total controller 201. The first secondary battery unit 203 includes a secondary battery 230, the voltmeter 211, the ammeter 212, and the battery controller 220, and the second secondary battery unit 204 includes a secondary battery 240, the voltmeter 211, the ammeter 212, and the battery controller 220.

Here, the secondary battery 230 and the secondary battery 240 are different in capacity and direct current resistance value. In the present embodiment, the secondary battery 230 has a characteristic of a large capacity and a high direct current resistance, and the secondary battery 240 has a characteristic of a small capacity and a low direct current resistance. The intended usage purposes of these two types of secondary battery units are slightly different according to the characteristics.

That is, the secondary battery system 250 according to the present embodiment is connected to a wind power generator similarly to Embodiment 4, and in the leveling of outputs from the wind power generator, the characteristic of a small capacity and a low direct current resistance of the secondary battery 240 is desirable for electric power variations in a short period of time, such as output pulsations along with an instant change in wind velocity. Therefore, also in the present embodiment, a current is caused to flow mainly in the second secondary battery unit 204 for the leveling.

On the other hand, the characteristic of a high direct current resistance and a large capacity of the secondary battery 230 is desirable for the load leveling in a long period of time in which charge is performed during nighttime with low electric power consumption and discharge is performed during daytime with high electric power consumption. Therefore, mainly the first secondary battery unit 203 is used for the levering.

It should be noted that FIG. 8 illustrates only one first secondary battery unit 203 and one second secondary battery unit 204, but a plurality of the first secondary battery units 203 and a plurality of the first secondary battery units 204 may be connected.

Also in the present embodiment, the battery controller 220 calculates the states of the secondary battery 230 and the secondary battery 240 and the upper limit values of electric power which can be charged and discharged, by means of the voltmeter 211, the ammeter 212, and the like connected to each of the secondary battery 230 and the secondary battery 240, and outputs the results to the total controller 201. Further, similarly to Embodiment 1, the ratio of the discharge direct current resistance to the charge direct current resistance of each of the secondary battery 230 and the secondary battery 240 is detected, and it is detected whether or not each of the secondary batteries is in a temporary deterioration state due to the charge and discharge with a large current.

Then, if it is detected that the secondary battery 230 or the secondary battery 240 is in the temporary deterioration state due to the charge and discharge with a large current, the battery controller 220 of the corresponding first secondary battery unit 203 or the corresponding second secondary battery unit 204 transmits a signal for resting this secondary battery 230 or this secondary battery 240 for a given period to the total controller 201.

After that, the total controller 201 disconnects the corresponding first secondary battery unit 203 or the corresponding second secondary battery unit 204 from the secondary battery system 200 for a given period, to thereby prevent the corresponding secondary battery unit 203 or 204 from being charged and discharged. In this case, only the remaining secondary battery unit is used for the leveling.

It should be noted that, similarly to Embodiment 4, in the case where the first and second secondary battery units 203 and 204 and the secondary batteries 230 and 240 are configured to be easily replaceable, the total controller 201 may display the corresponding secondary battery unit 203 or 204 and the corresponding secondary battery 230 or 240 as a replacement target to a user, to thereby maintain predetermined performance by such replacement.

As described above, also in the present embodiment, with the use of a simple detection method of detecting the ratio of the discharge direct current resistance to the charge direct current resistance of the secondary battery, it is possible to detect that the secondary battery is used with a large current beyond normal expectation. Then, the charge and discharge is suspended, to thereby make it possible to suppress the deterioration of the secondary battery.

In this way, the deterioration state of the secondary battery can be accurately calculated, and an appropriate using method is applied, to thereby make it possible to extend the life of the secondary battery.

It should be noted that, in the respective embodiments, when it is detected that a large current is charged to and discharged from the secondary battery capacity, the charge and discharge of the secondary battery is prohibited for a rest until the direct current resistance of the secondary battery which has temporarily increased decreases to some degree, or the replacement possibility of the secondary battery is encouraged. In the case where the charge and discharge with a large current frequently occurs, the cause may be an abnormality of the battery controller and the total controller which controls the entire system or a design error of the secondary battery capacity in the system. Therefore, on the basis of an occurrence frequency of the charge and discharge with a large current, the total controller may make a display indicating a failure as described above or an increase in the secondary battery capacity.

As has been described hereinabove, according to the present invention, without adding any special hardware, it is possible to simply and accurately detect a temporary increase in the direct current resistance of the secondary battery caused by charging and discharging a large current to and from the secondary battery capacity, on the basis of the relation between the direct current resistance of the secondary battery at the time of charge and the direct current resistance of the secondary battery at the time of discharge. As a result, without a considerable increase in cost, it becomes possible to properly manage the secondary battery in the secondary battery system with a simple configuration, and to extend the life of the secondary battery to the maximum. Therefore, the present invention can be expected to be utilized not only in a hybrid system for automobiles or railways but also in a wide field, for example, an electric power generating system using a secondary battery.

What is claimed is:

1. The secondary battery system comprising:
a battery controller which controls charge and discharge of a secondary battery;
a total controller which controls the entire system;
an ammeter which detects a charge current and a discharge current of the secondary battery;
a voltmeter which detects a voltage of the secondary battery, and
determination means for obtaining a direct current resistance of the secondary battery at the time of charge and a direct current resistance of the secondary battery at the time of discharge on the basis of a current value and a voltage value detected by the ammeter and the voltmeter, to thereby determine a temporary increase in the direct current resistance of the secondary battery caused by charge and discharge with a current on the basis of a relation between the two obtained direct current resistances,
wherein the determination means calculates a value of a ratio of the direct current resistance of the secondary battery at the time of the discharge to the direct current resistance of the secondary battery at the time of the charge (discharge resistance/charge resistance), and determines, when the calculated value of the ratio of the direct current resistances of the secondary battery decreases to be equal to or smaller than a predetermined value, the temporary increase in the direct current resistance of the secondary battery caused by the charge and discharge with a large current, and the total controller outputs, when the determination means determines the temporary increase in the direct current resistance of the secondary battery, a signal for stopping a use of the secondary battery for a given period via the battery controller, to thereby suspend the charge and discharge of the secondary battery.

2. The secondary battery system according to claim 1, wherein the determination means determines, when the value of the ratio of the direct current resistances of the secondary battery is equal to or smaller than 1.05, the temporary increase in the direct current resistance of the secondary battery caused by the charge and discharge with a large current.

3. The secondary battery system according to claim 1, wherein the secondary battery system is a secondary battery system comprising:

a plurality of secondary batteries; a plurality of battery controllers which control the respective secondary batteries; and a total controller which controls the entire system, and the secondary battery system comprises the determination means for obtaining, for each of the plurality of secondary batteries, the direct current resistance of the secondary battery at the time of the charge and the direct current resistance of the secondary battery at the time of the discharge on the basis of the current value and the voltage value detected by the ammeter and the voltmeter, to thereby determine the temporary increase in the direct current resistance of the secondary battery caused by the charge and discharge with a large current on the basis of the relation between the two obtained direct current resistances.

4. The secondary battery system according to claim 3, wherein the plurality of secondary batteries are periodically brought into a resting state one after another.

5. The secondary battery system according to claim 3, wherein the plurality of secondary batteries comprise two types of secondary batteries having different characteristics.

6. The secondary battery system comprising:
a battery controller which controls charge and discharge of a secondary battery;
a total controller which controls the entire system;
an ammeter which detects a charge current and a discharge current of the secondary battery;
a voltmeter which detects a voltage of the secondary battery, and
determination means for obtaining a direct current resistance of the secondary battery at the time of charge and a direct current resistance of the secondary battery at the time of discharge on the basis of a current value and a voltage value detected by the ammeter and the voltmeter, to thereby determine a temporary increase in the direct current resistance of the secondary battery caused by charge and discharge with a current on the basis of a relation between the two obtained direct current resistances,
wherein the determination means calculates a difference between a rate of increase of the direct current resistance of the secondary battery at the time of the discharge and a rate of increase of the direct current resistance of the secondary battery at the time of the charge, and determines, when the calculated difference becomes a negative value equal to or smaller than a predetermined value, the temporary increase in the direct current resistance of the secondary battery caused by the charge and discharge with a large current, and the total controller outputs, when the determination means determines the temporary increase in the direct current resistance of the secondary battery, a signal for stopping a use of the secondary battery for a given period via the battery controller, to thereby suspend the charge and discharge of the secondary battery.

7. The secondary battery system comprising:
a battery controller which controls charge and discharge of a secondary battery;
a total controller which controls the entire system;
an ammeter which detects a charge current and a discharge current of the secondary battery;
a voltmeter which detects a voltage of the secondary battery, and
determination means for obtaining a direct current resistance of the secondary battery at the time of charge and a direct current resistance of the secondary battery at the time of discharge on the basis of a current value and a voltage value detected by the ammeter and the voltmeter, to thereby determine a temporary increase in the direct current resistance of the secondary battery caused by charge and discharge with a current on the basis of a relation between the two obtained direct current resistances,
wherein the secondary battery system is a hybrid system comprising an engine, an electric power generator, a motor, a secondary battery, a battery controller which controls charge and discharge of the secondary battery, and a total controller which controls the entire system, and
the total controller outputs, when the determination means determines the temporary increase in the direct current resistance of the secondary battery caused by the charge and discharge with a large current, a signal for stopping a use of the secondary battery for a given period via the battery controller, to thereby suspend the charge and discharge of the secondary battery.

8. The secondary battery system according to claim 7, wherein
the hybrid system is a hybrid system which is applied to means of transportation used on a day-to-day basis, and
when the signal for stopping the use of the secondary battery for the given period is outputted, a period of the stop includes a nighttime rest of the means of transportation.

9. The secondary battery system according to claim 7, wherein measurement of the direct current resistance of the secondary battery at the time of the charge and the direct current resistance of the secondary battery at the time of the discharge, and calculation of the ratio of the two measured direct current resistances or the difference between the rates of increase thereof are carried out after the secondary battery has been rested for a given period.

10. The secondary battery system comprising:
a battery controller which controls charge and discharge of a secondary battery;
a total controller which controls the entire system;
an ammeter which detects a charge current and a discharge current of the secondary battery;
a voltmeter which detects a voltage of the secondary battery, and
determination means for obtaining a direct current resistance of the secondary battery at the time of charge and a direct current resistance of the secondary battery at the time of discharge on the basis of a current value and a voltage value detected by the ammeter and the voltmeter, to thereby determine a temporary increase in the direct current resistance of the secondary battery caused by charge and discharge with a current on the basis of a relation between the two obtained direct current resistances, wherein the secondary battery system is an electric power generating system comprising: an electric power generating unit which utilizes natural energy; a secondary battery; a battery controller which controls charge and discharge of the secondary battery; and a total controller which controls the entire system, and the total controller outputs, when the determination means determines the temporary increase in the direct current resistance of the secondary battery caused by the charge and discharge with a large current, a signal for stopping a use of the secondary battery for a given period via the battery controller, to thereby suspend the charge and discharge of the secondary battery.

\* \* \* \* \*